United States Patent
Haushaelter et al.

(10) Patent No.: US 6,840,502 B2
(45) Date of Patent: Jan. 11, 2005

(54) FLAP VALVE FOR FUEL AGGREGATES

(75) Inventors: Peter Haushaelter, Moenchengladbach (DE); Michael Benra, Witten (DE); Rolf Lappan, Cologne (DE); Martin Nowak, Burscheid (DE)

(73) Assignee: Pierburg GmbH, Neuss (DE)

( * ) Notice: Subject to any disclaimer, the term of this patent is extended or adjusted under 35 U.S.C. 154(b) by 38 days.

(21) Appl. No.: 10/356,658

(22) Filed: Jan. 31, 2003

(65) Prior Publication Data

US 2003/0164464 A1 Sep. 4, 2003

(30) Foreign Application Priority Data

Feb. 6, 2002  (DE) .......................................... 102 04 787

(51) Int. Cl.⁷ .............................................. F16K 25/00
(52) U.S. Cl. ...................... 251/173; 251/192; 251/307
(58) Field of Search ................................ 251/173, 306, 251/192, 307, 337, 336

(56) References Cited

U.S. PATENT DOCUMENTS

| | | | |
|---|---|---|---|
| 3,650,508 A | | 3/1972 | Kosmala ..................... 251/174 |
| 4,120,482 A | * | 10/1978 | Cox ............................ 251/306 |
| 4,195,815 A | | 4/1980 | Stager ........................ 251/306 |
| 4,210,313 A | * | 7/1980 | Chester ...................... 251/306 |
| 4,220,172 A | * | 9/1980 | Stager ........................ 251/173 |
| 4,289,296 A | * | 9/1981 | Krause ....................... 251/306 |
| 4,378,104 A | * | 3/1983 | Ben-Ur ....................... 251/173 |
| 4,487,216 A | * | 12/1984 | Barker et al. ............... 251/173 |
| 4,836,499 A | * | 6/1989 | Steele et al. ................ 251/173 |
| 6,338,467 B1 | | 1/2002 | Mabboux et al. ........... 251/305 |

FOREIGN PATENT DOCUMENTS

GB            2 121 513 A        12/1983

* cited by examiner

Primary Examiner—John Bastianelli
(74) Attorney, Agent, or Firm—Ohlandt, Greeley, Ruggiero & Perle

(57) ABSTRACT

A flap valve for fuel aggregates, such as fuel cells, comprises a flap arranged within a flow channel. A shaft for pivoting the flap is connected to the flap. Further, a seal disposed in a recess of the channel wall is provided, which comprises at least one pressure pocket connected with the flow channel.

9 Claims, 2 Drawing Sheets

FLAP VALVE FOR FUEL AGGREGATES

FIELD OF THE INVENTION

The invention relates to a flap valve for fuel aggregates that are particularly utilized in motor vehicles.

DISCUSSION OF THE BACKGROUND ART

Fuel aggregates for motor vehicles comprise a fuel cell in which electric energy is produced, commonly by the use of hydrogen and oxygen. If necessary, a reformer precedes the fuel cell. By means of the reformer, hydrogen can be obtained from conventional fuels such as gasoline, diesel oil or methanol, which is then supplied to the fuel cell. Because of the reformer preceding, fuel aggregates can be used in motor vehicles without the requirement of a supply of hydrogen being guaranteed all over. Generally, controllable valves are required between the reformer and the fuel cell to be able to supply the fuel cell with the appropriate amount of oxygen and hydrogen. Such valves, which may have the form of flap valves, for example, are throttle valves, for example, which serve as control or turnoff valves or also as bypass valves. Further, flap valves are also required if the fuel aggregate does not have a reformer and the fuel cell is rather supplied with hydrogen from a hydrogen tank. Then, the valves are arranged between the hydrogen tank and the fuel cell.

Fuel aggregates require that the utilized valves are able to close a flow channel extremely tightly. This is required for the use of hydrogen, for example, because mixtures of hydrogen and air may explode even with low shares of hydrogen. Furthermore, very high tightnesses of the valves are required since hydrogen is a fluid gas, i.e., a gas with very small molecules.

SUMMARY

It is the object of the invention to provide a flap valve for fuel aggregates by means of which a high tightness can be achieved.

The flap valve for fuel aggregates according to the invention, particularly for fuel aggregates used in motor vehicles, which comprise a fuel cell and, if necessary, a reformer or a hydrogen tank or the like, comprises a flap arranged within a flow channel. The flap is connected to a shaft. By actuation of the shaft, the flap can be pivoted in the preferably roundflow channel. To this end, the shaft is provided, for example, with an electric drive module with a suitable position detection. Depending on the position of the flap, the mass flow can be regulated or the channel can be closed.

For tightly closing the channel, the flap valve comprises a seal connected with the channel wall. Preferably, the seal is a circumferential seal so that the flap is sealed against the channel wall over its entire circumference. According to the invention, the seal comprises at least one pressure pocket communicating with the flow channel. The pressure prevailing in the pressure pocket leads to the fact that the seal is partially pressed into the flow channel. When the flap is closed, this results in that the seal or a sealing surface of the seal is pressed strongly against the flap and thus, the tightness is increased. The tightness of the flap valve according to the invention is due to the provision of a pressure pocket in the seal, which results from the admitted pressure of the flow medium for radially displacing the seal or for pressing the seal against the flap, very high. Thus, with only a low expenditure of force a very high tightness can be achieved. With conventional seals, where a sealing surface is pressed against a seal, high tightnesses can only be achieved by pressing the sealing surface against the seal with high force. With the flap valve according to the invention, the sealing effect is reinforced by the prevailing pressure of the flow medium. Therefore, no high adjusting forces are required for the flap valves according to the invention, so that the flap can be closed and opened with a low torque.

Because of the high achievable tightness of the flap valve according to the invention, an easily controllable flap valve can be used, with a low expenditure of force, even in fuel aggregates where fluid and/or highly explosive gases are used.

Preferably, the flow channel as well as the flap are made of corrosion-proof material, particularly of stainless steel 1.4435 or of a higher quality. The seal is preferably made of an elastic material, particularly of an elastomer such as fluorcaoutchouc. This has the advantage that hydrogen and the deionized water the medium might contain, which are highly corrosive substances having a high corrosiveness particularly at high temperatures and high pressures, can be guided through such flow channels over extended periods of time without the flap valve according to the invention suffering from any damage. The temperatures occurring may vary between −35° C. and 100° C., in which case pressure differences of about 2 bar may occur. Thus, the flap valve according to the invention has a long working life of up to 6000 h and more.

In a particularly preferred embodiment of the invention, the seal comprises at least two pressure pockets connected to the flow channel. The two openings of the pressure pockets are oriented in opposite directions. Thus, pressure is always generated in one of the two pressure pockets, depending on the flow direction of the medium in the flow channel. Thus, it is ensured that the seal tightly contacts the flap upon closing the flow channel even if the flow direction is reversed.

It is particularly preferred to fix the seal in a recess of the channel wall by a clamping ring. In this connection, the clamping ring may be disposed in one of the pressure pockets, for example, or plastics may be injected around it in case of an elastomeric seal, for example, so that the clamping ring is arranged within the seal. By providing a clamping ring, the seal is securely held in the recess even in case of strong pressure differences between the two sides of the flap. High pressure differences occur, for example, in case of very small mass flows, i.e., if the flap is only slightly opened. Then, it has to be ensured that the seal is not pulled into the flow channel.

BRIEF DESCRIPTION OF THE DRAWINGS

Hereinafter, the invention is explained in detail with respect to a preferred embodiment thereof, with reference to the accompanying drawings in which.

PREFERRED EMBODIMENT

Figure 1:
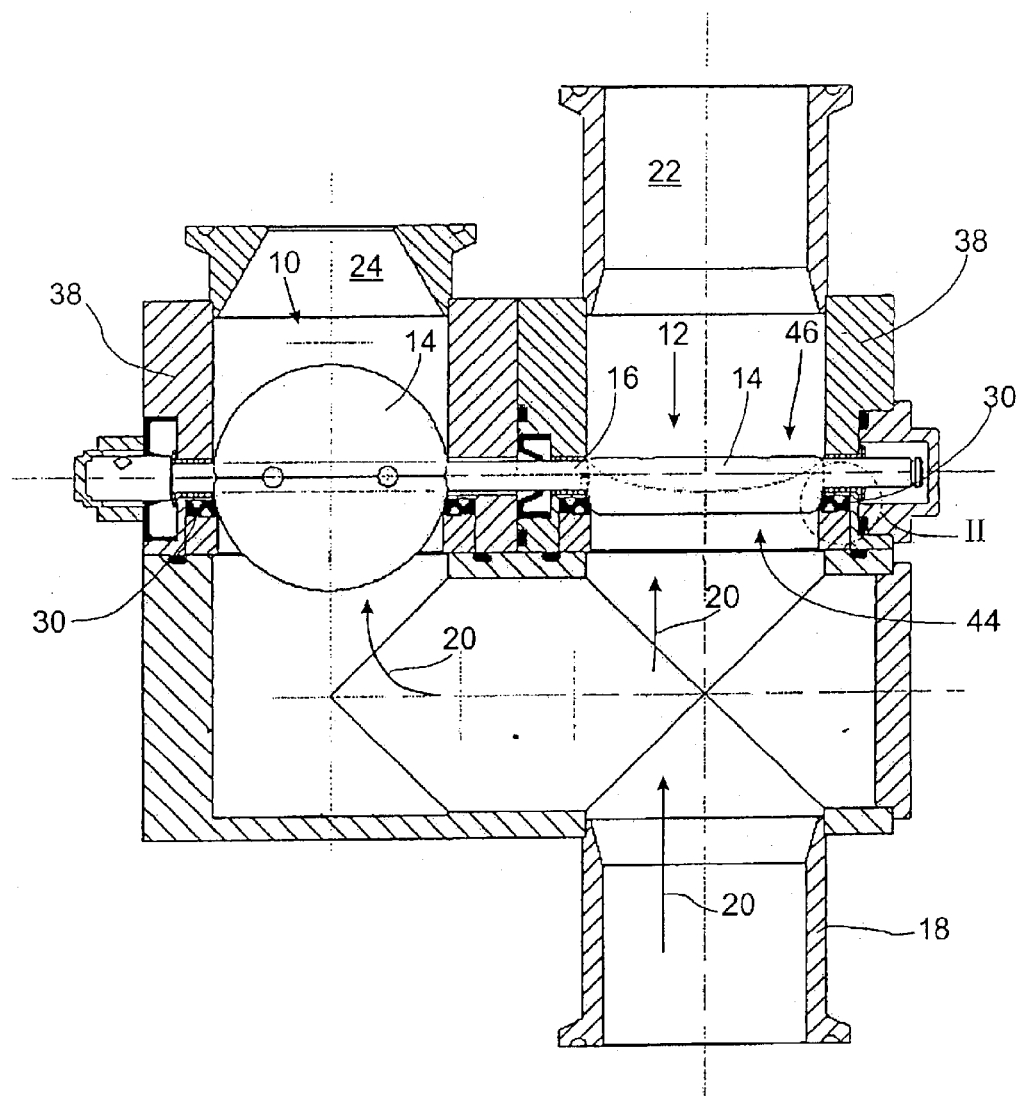
FIG. 1 is a schematic sectional view of a bypass valve.

As an example of the use of the flap valve according to the invention, FIG. 1 shows a bypass valve. A corresponding flap valve can also be disposed as a stop and control valve in a continuous flow channel.

The bypass valve comprises two interconnected flap valves 10, 12. Each of the flap valves comprises a flap 14, the two of which being connected to each other via a common shaft 16. The two flaps 14 are arranged relative to each other at an angle of 90°. In the illustrated embodiment, the medium flows through a supply channel 18 in the flow direction 20. In the illustrated flap position, a first flow channel 22 is closed and a second flow channel 24 is open, so that the medium flows through the second flow channel 24. The common shaft 16 is connected to a non-illustrated electric drive module for switching the two flap valves. In case of a bypass module, the drive module typically is one that rotates the shaft 16 such that one of the two flow channels 22,24 is always open and the other one closed. Particularly with a flap valve serving as throttle flap or the like, which has a single flap only, the electric drive module is configured such that the angular position of the flap is able to be controlled in an extremely fine manner.

Figure 2:
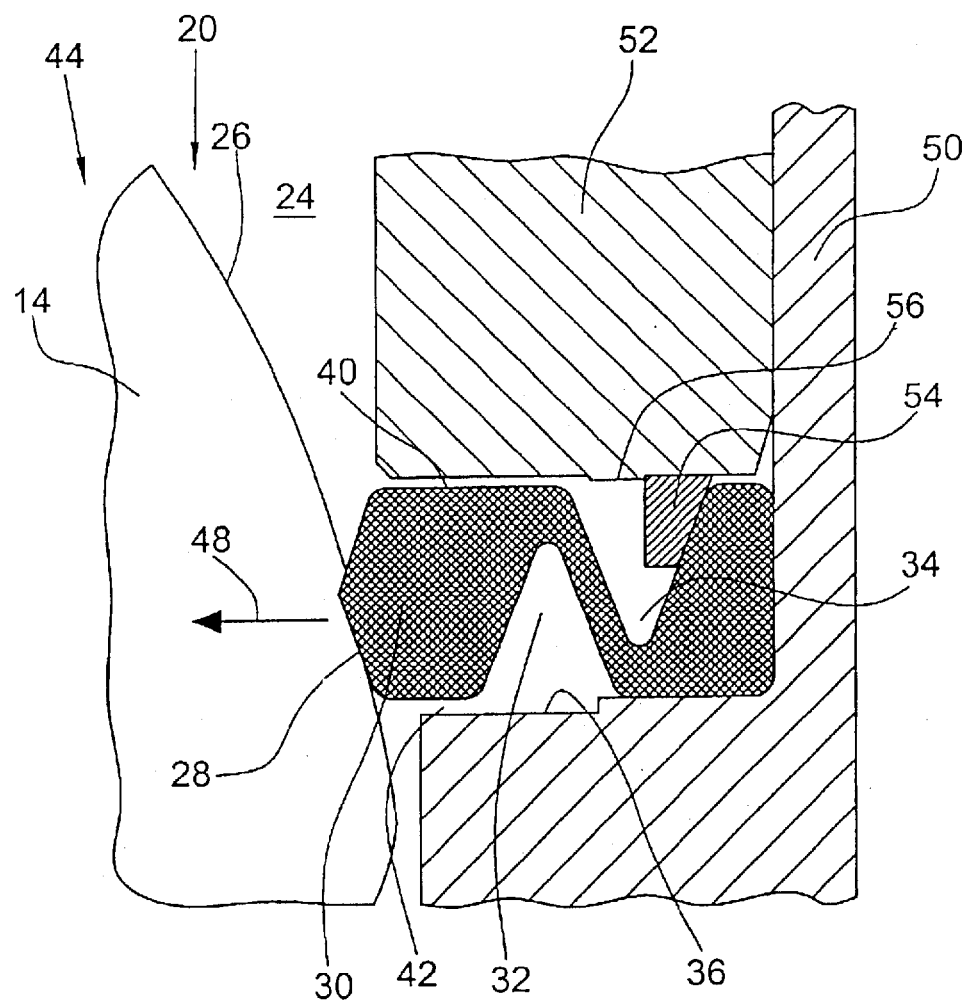
FIG. 2 is an enlarged view of the portion II in FIG. 1.

The flaps 14 utilized are preferably spherically configured flaps, e.g., spherical segments. Thereby, a contact surface 26 of the flap 14 which is contacted by a contact surface 28 of a seal 30 (FIG. 2) is configured. Thus, the seal 30 contacts an outer surface of the flap 14 so that the sealing is effected in radial direction. Preferably, the shaft 16 is arranged without the center plane of the flap 14. Because of this preferred design of the flap and such an arrangement of the shaft, a very good sealing as well as a good control of the mass flow can be realized.

The seal 30, which is preferably an annular seal surrounding the entire flow channel 22,24, comprises two opposed pressure pockets 32,34. The pockets 32,34 also have the form of an annulus and extend over the entire circumference of the sealing ring 30. The seal 30 is disposed in a recess 36 of a channel wall 38 which has a tubular shape and forms the flow channel 24 and 22, respectively. Preferably, at least two thirds of the width of the seal 30 are disposed within the recess 36.

In the main flow direction 20, the sealing ring 30 is arranged in front of the shaft 16. This has the advantage that a good sealing can be achieved when the flow is as usual. The main flow direction is that direction in which the medium is transported.

The two pressure pockets 32,34 are arranged one behind the other in radial direction, i.e. vertical to the channel wall 38 such that an inner pocket 32 and an outer pocket 34 are formed. With respect to the axial width of the seal 30, the dimensions of the recess 36 in the channel wall 38 are chosen such that two channels 40,42 are formed. The two channels 40,42 are connected with the flow channel 24. Therefore, the same pressure as that in the flow channel 24 prevails in the pockets 32,34. When the flap 14 is closed (FIG. 1), overpressure with respect to the opposed side prevails on one side 44 of the flap 14, which is pressurized. The outer pocket 34 is connected to the overpressure side 44 of the flow channel 24 via the channel 40.

By arranging the seal 30 in the recess 36, the seal has a smooth surface in the two gaps 40,42, which serves as a sliding surface when the seal 30 is radially displaced in the direction of the arrow 48.

With the flap being closed, a pressure prevails in one or both chambers 32,34 by which the seal 30 is pressed against the surface 26 of the flap 14 in the direction of the arrow 48, i.e., in radial direction. To facilitate the mounting of the seal 30, the housing preferably comprises two parts 50,52 in this region.

Further, according to the invention, a clamping ring 54 preferably made of a spring steel or the like is provided. In the illustrated embodiment, the clamping ring 54 is disposed in the outer pressure pocket 34 and serves to maintain the seal 30 in the recess 36. This is particularly necessary with a small aperture angle of the flap 14 and the resulting large eddying effects in order to prevent that the seal 30 is pulled into the flow channel 24. In order to hold the clamping ring 54, a nose or projection 56 is provided on the housing part 52 on which the clamping ring 54 is supported. Preferably, the nose is annular in shape.

What is claimed is:

1. A flap valve for fuel aggregates, comprising:

a flap arranged within a flow channel, a shaft connected to the flap, for pivoting the flap, and a seal connected with a channel wall having at least two angled surfaces, said surfaces forming an arrow shape, and capable of forming a distance to said flap, wherein one of said surfaces is capable of contacting said flap, wherein said seal comprises at least two pressure pockets communicating with the flow channel, whose opening points to opposite directions.

2. The flap valve according to claim 1, wherein said seal is arranged in front of the shaft in a main flow directions.

3. The flap valve according to claim 1, wherein said two pressure pockets are arranged one behind the other in a radial direction.

4. The flap valve according to claim 1, wherein one of said two pressure pockets is an outer pressure pocket connected to an overpressure side.

5. The flap valve according to claim 1, wherein said seal is partially disposed within a recess provided in the channel wall.

6. The flap valve according to claim 1, further comprising a clamping ring fixing the seal.

7. The flap valve according to claim 6, wherein said clamping ring is disposed in said pressure pocket.

8. The flap valve according to claim 1, wherein said seal comprises an elastic material.

9. The flap valve according to claim 8, wherein said elastic material is an elastomer.

* * * * *